2,946,721

EMULSIFICATION OF WATER-INSOLUBLE ORGANIC SOLVENTS

Robert C. Hyatt, Cranford, and Raymond L. Mayhew, Phillipsburg, N.J., and Leslie G. Nunn, Brooklyn, Ohio, assignors to General Aniline & Film Corporation, New York, N.Y., a corporation of Delaware No Drawing. Filed Dec. 17, 1954, Ser. No. 476,082

15 Claims. (Cl. 167—42)

This invention relates to the emulsification of water-insoluble organic solvents and more particularly to the provision of a novel combination of surface active agents for use in such emulsification.

It is often highly desirable to produce stable aqueous emulsions of organic water-insoluble solvents which may or may not have functional agents dissolved therein, as for example, biocides, textile assistants, and the like. A substantial proportion of such biocides, which have found increasing use as agricultural and/or sanitary chemicals during the past decade, are water-insoluble and are accordingly commonly applied in the form of emulsions in water. Generally, the biocide is dissolved in an organic solvent to form a concentrate and the concentrate is then prepared for use by emulsification in water. In producing such emulsions, the use of various types of surface active agents as emulsifying agents has been proposed. However, in view of the diverse nature of the biocides, addition agents, concentrations and the like, employed in formulating such emulsions, the selection of the proper emulsifying agent in any particular instance is difficult. The selection of the proper emulsifying agent is rendered complex by such factors as compatibility with the biocide and the solvent, stability of the agent in the organic solvent and/or in water, solubility in the organic solvent, and the like. It is accordingly highly desirable to provide a substantially universal emulsifier useful in organic water-insoluble biocide concentrates which will not be subject to the aforementioned deficiencies. Obviously, the foregoing considerations with respect to biocides apply as well to other functional agents dissolved in the water-insoluble organic solvent instead of or in addition to the biocide.

It is an object of this invention to provide an improved emulsifier which is stable and soluble in water-insoluble organic solvent concentrates, which may if desired contain functional agents dissolved thereon. A further object of this invention is the provision of a stable concentrate comprising a solution of such an improved emulsifier in a water-insoluble organic solvent. Still another object of this invention is the provision of a stable emulsion of the aforementioned concentrate in water. Other objects and advantages will appear as the description proceeds.

The attainment of the above objects is made possible by the instant invention which is based upon the discovery that a mixture comprising from about 50 to 90 parts by weight of a water soluble synthetic non-ionic surface active agent containing a polyoxyalkylene chain of at least 2 alkenoxy groups and derived from an alkyl phenolic compound in which the total number of alkyl carbon atoms is from about 4 to 24, and about 10 to 50 parts by weight of the cyclohexylammonium salt of an alkylbenzene sulfonic acid containing at least one alkyl group of at least 3 carbon atoms constitutes an improved emulsifier soluble and stable in water-insoluble organic solvents for producing "soluble" solvent concentrates which may be readily mixed in water to produce stable oil-in-water emulsions. The said mixture exhibits a synergistic effect since it has been found superior to either of the two components thereof.

The above defined non-ionic surface active agents operative in the instant invention may be more specifically represented by the general formula

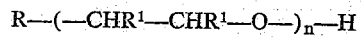

wherein R represents the residue of a suitable alkyl phenol, $R^1$ represents hydrogen or lower alkyl, and $n$ has a value of from 2 to 100 or more and usually from about 4 to 30. Compounds of this type are well known in the art and are disclosed along with suitable methods for their preparation in numerous patents and other publications. In general, they may be obtained by condensing a polyglycol ether containing the required number of alkenoxy groups or an alkylene oxide such as propylene oxide, butylene oxide, or preferably ethylene oxide, with a suitable alkyl phenol. The amount of alkylene oxide condensed with the alkyl phenol, i.e., the length of the polyoxyalkylene chain, will depend primarily upon the particular compound with which it is condensed. As a convenient rule of thumb, approximately 1 mole of alkylene oxide should be employed for each two carbon atoms in the alkyl phenol. However, the optimum amount of alkylene oxide may readily be determined in any particular case by preliminary test and routine experimentation.

Poly-alkylene oxide derivatives of phenolic compounds containing one or more alkyl substituents, which may be employed in the compositions of the present invention, are described in U.S. Patents 2,213,477 and 2,593,112. Those preferred are the water soluble polyalkylene oxide derivatives of alkyl phenolic compounds in which the total number of alkyl carbon atoms is between 4 and 20. As examples of such phenolic compounds may be mentioned normal and isomeric butyl, amyl, dibutyl and diamyl phenols and cresols, tripropyl phenols and cresols, heptyl, octyl, nonyl, decyl, undecyl, dodecyl, tetradecyl, cetyl, oleyl, octadecyl and the like, phenols and cresols, in addition to dihexyl- and trihexyl-phenol prepared from hexene-1 and phenol, diisoheptyl-phenol, dioctyl-phenol, dinonyl-phenol, dioctyl-p-cresol, di-octyl-o-cresol, didecyl-phenol, didecyl-p-cresol, didodecyl-phenol, and the like. Of particular value are the polyalkylene oxide derivatives of secondary and tertiary alkyl substituted phenols and cresols obtained by condensing olefines of the type obtained in petroleum refining with phenols or cresols. In the case of products obtained by condensing phenol or cresol with olefines of from 3 to 5 carbon atoms such as propylene, butylene and amylene, it is desirable to employ the dialkylated phenols or cresols, while in the case of compounds obtained by condensing a phenol or cresol with an olefine containing 8 or more carbon atoms, the mono-substituted derivatives are preferred. Particularly desirable derivatives can be obtained from the phenols and cresols containing a substituent derived from olefines containing from 8 to 18 carbon atoms, such as diisobutylene and other alkylenes as nonylene, decylene, undecylene, dodecylene, pentadecylene, octadecylene and mixtures thereof, and may advantageously be the dimers and trimers obtained by polymerization of such low molecular weight olefines as propylene, butylene, isobutylene, amylene or mixtures thereof.

The alkyl benzene sulfonic acids also constitute a group of anionic surface active agents well known and described in the prior art. However, it has been found that the desired results herein are obtained only when employing the salts of such alkyl benzene sulfonic acids with cyclohexylamine containing at lease one alkyl group of at least 3 carbon atoms. In general, such salts are not water soluble or readily water dispersible and may be more specifically represented by the following general formula

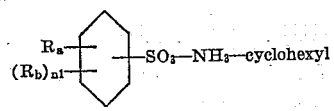

wherein $R_a$ is an alkyl radial of at least 3 carbon atoms; $R_b$ is an alkyl radical; and $n_1$ has a value of 0 to 3. The salt preferred for use in the instant invention because of the superior results obtained thereby is the cyclohexylammonium salt of dodecylbenzene sulfonic acid ($R_a$ is dodecyl and $n_1$ is zero). These anionic surface active agents may be prepared in known manner by alkylating a benzene compound with straight chain or branch chain olefines, sulfonating the resulting alkylated benzene compound and then neutralizing with cyclohexylamine. In the above formula, $R_a$ may be propyl, isopropyl, butyl, isobutyl, amyl, and similar normal and isomeric alkyl radicals up to octadecyl and the like. $R_b$ may represent methyl and ethyl in addition to any of the values given for $R_a$.

As stated above, the invention herein resides in the combination of the non-ionic surface active agent and anionic surface active agent above defined and no claim is made herein to the individual components of the mixture. The above-described emulsifier mixtures of the instant invention have been found to have improved and unexpected properties in that when dissolved in any desired proportions, as for example, from about 1 to 90% by weight, in a water-insoluble organic solvent, the concentrates thus formed are stable and readily dispersible in water to produce oil-in-water emulsions which have improved properties with respect to stability, appearance, and the like. As stated above, the water-insoluble organic solvent to be rendered "soluble" and emulsified may have dissolved therein functional agents in any desired proportions, such as from 3 to 100% by weight of the solvent-functional agent mixture. It will thus be obvious that the water-insoluble organic solvent may per se be a functional agent, as for example mineral oils, cutting oils, fumigants, biocides, textile assistants, and the like.

The term "biocide" is employed herein and in the appended claims to include insecticides, fungicides, bactericides, herbicides, pest-repellants, and the like. By way of example, the emulsifier mixtures of this invention may be employed in producing emulsifiable concentrates containing one or more of the following biocides:

| Trivial or Trade Name | Chemical Name |
|---|---|
| DDT | 2,2-bis(p-chlorophenyl)-1,1,1-trichloroethane. |
| DDD | 2,2-bis(p-chlorophenyl)-1,1-dichloroethane. |
| 2,4-D and esters | 2,4-dichlorophenoxyacetic acid. |
| 2,4,5-T and esters | 2,4,5-trichlorophenoxyacetic acid. |
| Toxaphene | chlorinated camphene (67-69% Cl). |
| Chlordane | contains 60% of 1,2,4,5,6,7,8,8-octachloro-4,7 methano-3a,4,7,7a-tetrahydroindane. |
| Dilan | ⅓ tech. 2-nitro-1,1-bis(p-chlorophenyl) propane and ⅔ tech. 2-nitro-1,1-bis(p-chlorophenyl) butane. |
| nicotine sulfate | 1-methyl-2-β-pyridyl-pyrrolidine sulfate. |
| Dieldrin | contains 85% of 1,2,3,4,10,10-hexachloro-6,7 epoxy-1,4,4a,5,6,7,8,8a - octahydro -1,4,5,8 - di- methanonaphthalene. |
| Lindane | 1,2,3,4,5,6-hexachlorocyclohexane (99% gamma isomer). |
| B.H.C | mixed isomers of 1,2,3,4,5,6-hexachlorocyclohexane. |
| C.P.R | 5.1% piperonyl cyclonene, 0.51% pyrethrum, 2.55% rotenone. |
| I.P.C | isopropyl N-phenyl carbamate. |
| Chloro I.P.C | isopropyl-N-(3-chlorophenyl)carbamate. |
| Methoxychlor | 1,1,1-trichloro-2,2-bis(p-methoxyphenyl)ethane. |
| Aldrin | 95% 1,2,3,4,10,10-hexachloro-1,4,4a,5,8,8a-hexahydro-1,4,5,8-dimethanonaphathlene. |
| Parathion | o,o-diethyl-o,p-nitrophenylthiophosphate. |

Suitable organic water-insoluble solvents which may be employed in preparing the concentrates, include aliphatic and aromatic hydrocarbons having a carbon content of at least 6, such as kerosene, mineral seal oil, diesel oil, gas oil, mineral oil, xylene, alkylated benzenes, and alkylated naphthalenes. It is understood that compatible alcohols, esters, ketones, etc. which may have a desirable effect may also be employed.

The emulsifiable concentrates produced in accordance with this invention are readily prepared for application in their intended use by mixing in water. The concentration of the emulsion will of course vary in accordance with the particular functional agent, solvent, use contemplated, and the like, but in general from about .01 to 20 percent of the concentrate by volume in the aqueous emulsion is sufficient for the usual purposes.

The following examples of emulsifier mixtures are illustrative of preferred embodiments of this invention and are not to be regarded as limitative. Parts are by weight unless otherwise indicated, the term "CDS" means "cyclohexylammonium dodecylbenzene sulfonate," the term "EtO" means ethylene oxide" and the parenthetical term appearing adjacent thereto indicates the mole ratio of components in the non-ionic surface active agent.

EXAMPLE I 70 parts nonylphenol:EtO (1:9.5)
30 parts CDS

EXAMPLE II 70 parts nonylphenol:EtO (1:10.5)
30 parts CDS

EXAMPLE III 49 parts castor oil:EtO (1:30)
21 parts nonylphenol:EtO (1:4)
30 parts CDS

EXAMPLE IV 70 parts dinonylphenol:EtO (1:17)
30 parts CDS

EXAMPLE V 80 parts nonylphenol:EtO (1:9.5)
20 parts CDS

EXAMPLE VI 90 parts nonylphenol:EtO (1:9.5)
10 parts CDS

EXAMPLE VII 50 parts dinonylphenol:EtO (1:17)
25 parts CDS
25 parts Velsicol AR-50

EXAMPLE VIII 70 parts of nonylphenol:EtO (1:9.5)
15 parts cyclohexylammonium nonyl dodecylbenzene sulfonate
15 parts Velsicol AR-50

EXAMPLE IX 70 parts dinonylphenol:EtO (1:17)
15 parts cyclohexylammonium nonyl dodecylbenzene sulfonate
15 parts Velsicol AR-50

EXAMPLE X 50 parts nonylphenol:EtO (1:9.5)
25 parts CDS
25 parts Velsicol AR-50

The foregoing emulsifier mixtures were tested in various manner, including the tests described below, and were found to achieve the desired results of the instant invention with respect to spontaneity of emulsification, emulsion stability, overall emulsion appearance, and the like.

Performance in 8 lb./gal. toxaphene

Emulsifiable toxaphene concentrates were prepared containing 73% toxaphene, 21% kerosene and 6% emulsifier (8 lb./gal. toxaphene). The test also requires the use of 342 p.p.m. water (20 grain hard water) which is used in nearly all military specifications in this field. It is prepared with 0.3037 g. calcium chloride (anhydrous), 0.1388 g. magnesium chloride·6H₂O and distilled water to make 1 liter.

To prepare the emulsion, 3 cc. of the concentrate to be tested is pipetted into 97 cc. of water of the desired hardness in a 250 cc. beaker. This mixture is then emulsified by stirring for 1 minute at 1000 r.p.m. with a Mixmaster using a T-type stirrer. The construction of this stirrer is described in Military Specification MIL–I–10502 (Insecticide, DDT, Emulsion Concentrate). The time of emulsion formation is recorded. The emulsion is transferred immediately into a 100 ml. graduate and stoppered. Emulsion stability readings are then taken at zero minutes, 1 hour and 24 hours under strong transmitted light. Desirable and undesirable characteristics of the emulsifier and emulsion are noted including foam, tendency to oil, opacity of emulsion, emulsion color, and areas in the emulsion tending to clear. Each emulsion is compared with a standard having a rating of A, the rating being based 60% for spontaneity of emulsifier, 20% for emulsion stability and 20% for overall emulsion appearance. In addition, the concentrate per se should exhibit no sludge, extreme darkening in color, or diminution in emulsifying capacity after storage for one week at 50° C. in glass and light. Results are shown in Tables 1 and 2.

*Performance in 6 lb./gal. toxaphene, 2 lb./gal. DDT and 4 lb./gal. 2,4–D isopropyl ester*

The tests were essentially the same as described above except that emulsifiable concentrates were employed as described in Tables 3, 4 and 5, respectively.

*Performance in 20% lindane*

20% lindane concentrates are prepared in accordance with Military Specification MIL–I–10917 (QMC), Insecticide, Lindane, Emulsifiable Concentrate. This calls for 20% lindane, a maximum of 32.5% solvent, a minimum of 40.0% isophorone (3,5,5-trimethyl-2-cyclohexen-1-one) and a minimum of 7.5% emulsifier. The concentrate must meet the closed cup flash point specification of 140° F. which means solvents are in effect restricted to the alkylated naphthalene type of which Velsicol AR–50G and Velsicol AR–50 are typical. As set forth in the specification, the emulsions are prepared in 250 ml. beakers with 5 cc. of the emulsifiable concentrate in 95 ml. of 342 p.p.m. hard water and using a Mixmaster stirring motor at 1000±50 r.p.m. equipped with a specified T-type stirrer. The emulsions are stirred for 1 minute and immediately poured into 100 ml. graduated cylinders and stoppered. The time of formation of emulsion is recorded in addition to creaming and oiling. After 30 minutes, the emulsions are examined carefully under strong transmitted light for signs of phase separations (creaming, oiling, etc.), and the observations noted. Emulsions are then allowed to stand at room temperature for 24 hours, the stoppered graduates inverted and righted through 30 complete cycles for reformation of emulsion and after 30 minutes standing again examined under strong light for phase separations. To meet the emulsion stability requirements of the specification, the emulsion formed must show no more than 2 ml. of cream layer separation and no oil separation after 30 minutes from initial formation and 30 minutes after reformation. This requirement is extremely difficult to meet with the specified minimum amount of emulsifier and usually requires at least 12 to 13% of the presently available types of emulsifiers.

The following tables show results obtained when the above described emulsifier mixtures made in accordance with this invention were subjected to the performance tests in toxaphene, DDT and 2,4–D isopropyl ester as described. Results are also shown for the individual components of the emulsifier mixtures of this invention. A comparison of these results will show that the emulsifier mixtures of this invention exhibit a synergistic effect as compared with the results of the components thereof.

TABLE 1.—PERFORMANCE IN 8 LB./GAL. TOXAPHENE
[Formula: 73% toxaphene; 21% kerosene; 6% emulsifier.]

| Emulsifier | Water Hardness (p.p.m.) | Rating |
| --- | --- | --- |
| I | 342 | A |
|   | 17  | B |
| II | 342 | A– |
|   | 17  | B– |
| III | 342 | A– |
|   | 17  | B |
| IV | 342 | A |
|   | 17  | B+ |
| Nonylphenol+9.5 moles Ethylene Oxide | 342 | C |
|   | 17  | D |
| CDS | 342 | E |
|   | 17  | E |

TABLE 2.—CONCENTRATION VS. PERFORMANCE
[Formula: 73% toxaphene; 21–24% kerosene; 3–6% emulsifier.]

| Emulsifier | Percent Conc. | Emulsion Rating | |
| --- | --- | --- | --- |
|   |   | 17 p.p.m. Water | 342 p.p.m. Water |
| I | 6 | B | A. |
|   | 5 | B– | A–. |
|   | 4 | C+ | B+. |
|   | 3 | C | B. |
| Nonyl Phenol+9.5 moles Ethylene Oxide | 6 | D | C. |
|   | 5 | D | C. |
|   | 4 | E | D. |
|   | 3 | No emulsion. | F. |
| CDS | 6 | E | E. |

TABLE 3.—PERFORMANCE IN 6 LB./GAL. TOXAPHENE
[Formula: 61% toxaphene; 35% kerosene; 4% emulsifier.]

| Emulsifier | Water Hardness (p.p.m.) | Rating |
| --- | --- | --- |
| I | 342 | A |
|   | 17  | B |
| II | 342 | A |
|   | 17  | B |
| IV | 342 | A |
|   | 17  | B– |
| V | 342 | A– |
|   | 17  |   |
| Nonyl Phenol+9.5 moles Ethylene Oxide | 342 | E |
|   | 17  | E– |
| Nonyl Phenol+6 moles Ethylene Oxide | 342 | C |
|   | 17  | E |
| Nonyl Phenol+10.5 moles Ethylene Oxide | 342 | E |
|   | 17  | E |
| CDS | 342 | E |
|   | 17  | E |

TABLE 4.—PERFORMANCE IN 2 LB./GAL. DDT
[Formula: 25% DDT; 72% xylene; 3% emulsifier.]

| Emulsifier | Water Hardness (p.p.m.) | Rating |
| --- | --- | --- |
| II | 0 (Distilled Water) | B– |
|   | 342 | A– |
| VII | 0 | A– |
|   | 342 | A |
| VIII | 0 | B– |
|   | 342 | A– |
| IX | 0 | B– |
|   | 342 | B+ |
| CDS | 0 | E |
|   | 342 | E |

TABLE 5.—PERFORMANCE IN 4 LB./GAL. 2,4–D ISOPROPYL ESTER
[Formula: 52.6% 2,4–D isopropyl ester; 42.1% Velsicol AR–50; 5.3% emulsifier.]

| Emulsifier | Rating in 342 p.p.m. Water | Extendibility 1 part Concentrate to 10 parts Diesel Oil |
| --- | --- | --- |
| I | B | Clear initially; Slightly hazy after 24 hours. |
| VII | A | Clear initially; Clear after 24 hours. |
| X | B | Do. |

When tested for performance in 20% lindane, it was found that emulsifier VI successfully met the requirements of Military Specification MIL-I-10917. As already stated, this specification is extremely difficult to meet. The synergism in the emulsifier mixtures of this invention is indicated by the fact that non-ionic surface active agents such as the condensation product of dinonylphenol with 17 moles of ethylene oxide, the condensation product of nonylphenol with 9.5 moles of ethylene oxide, and the condensation product of castor oil with 30 moles ethylene oxide fail to meet the requirements of said military specification.

Aside from emulsification of ordinary insecticides, the emulsifier of Example VII has been found to be particularly outstanding for emulsification of 2,4-D esters and 2,4,5-T esters. Concentrates may be prepared therefrom which have excellent spontaneity and stability and at the same time are extendible (1 to 10) with diesel oil. This extendibility is important since it is frequently desired to spray with an oil base, as along railroad right of ways where complete killing of all foliage is desired. Under these conditions all of the known emulsifiers for 2,4-D and 2,4,5-T esters separate, resulting in sediment and clogging of the spray equipment. The instant products utilizing CDS are the only ones known which are compatible with diesel, kerosene and fuel oil, yet give outstanding emulsions when diluted with water.

EXAMPLE XIII. — PREPARATION OF CYCLOHEXYLAMMONIUM DODECYLBENZENESULFONATE (CDS)

To a 1-liter, 3-neck, round bottom flask fiitted with stirrer, thermometer, and dropping funnel was added 109.2 parts of dodecyl (tetrapropylene) benzene. While maintaining at 20–30° C., 153 parts 20% oleum was added over a period of 2–3 hours. 176 parts of ice was then added and the temperature allowed to rise to 50–60° C. Agitation was stopped and charge allowed to stand for 3 hours at 50–60° C. and then the spent acid drawn off from the bottom layer. The residual sulfuric acid was neutralized, with caustic soda and then 43.6 parts of cyclohexylamine (the theoretical amount) was added. Yielded 1700 parts of heavy, wax-like material. This product may be diluted with a suitable solvent for greater ease of handling.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

We claim:

1. An emulsifier mixture comprising about 50 to 90 parts by weight of a water soluble synthetic nonionic surface active polyoxyethylene ether of an alkylated phenol containing from about 8 to 18 carbon atoms in said alkylated portion and from about 7 to 30 oxyethylene groups in said polyoxyethylene portion, and about 10 to 50 parts by weight of the cyclohexylammonium salt of an alkylbenzene sulfonic acid containing at least one alkyl group of at least 3 carbon atoms.

2. A mixture as defined in claim 1 wherein the alkyl benzene sulfonic acid is dodecylbenzene sulfonic acid.

3. A mixture as defined in claim 1 wherein the nonionic surface active agent is the condensation product of nonylphenol with 9.5 moles of ethylene oxide.

4. A mixture as defined in claim 1 wherein the nonionic surface active agent is the condensation product of dinonylphenol with 17 moles of ethylene oxide.

5. An emulsifiable concentrate comprising a solution of an emulsifier mixture as defined in claim 1 in a water-insoluble organic solvent.

6. An emulsifiable concentrate comprising a solution of a water-insoluble organic biocide and an emulsifier mixture as defined in claim 1 in a water-insoluble organic solvent.

7. An emulsifiable concentrate comprising a solution of an emulsifier mixture as defined in claim 2 in a water-insoluble organic solvent.

8. An emulsifiable concentrate comprising a solution of a water-insoluble organic biocide and an emulsifier mixture as defined in claim 2 in a water-insoluble organic solvent.

9. An emulsifiable concentrate comprising a solution of an emulsifier mixture as defined in claim 3 in a water-insoluble organic solvent.

10. An emulsifiable concentrate comprising a solution of a water-insoluble organic biocide and an emulsifier mixture as defined in claim 3 in a water-insoluble organic solvent.

11. An emulsifiable concentrate comprising a solution of an emulsifier mixture as defined in claim 4 in a water-insoluble organic solvent.

12. An emulsifiable concentrate comprising a solution of a water-insoluble organic biocide and an emulsifier mixture as defined in claim 4 in a water-insoluble organic solvent.

13. An emulsifier mixture comprising 70 parts by weight of the condensation product of 1 mole of nonylphenol with 9.5 moles of ethylene oxide, and 30 parts by weight of cyclohexylammonium dodecylbenzene sulfonate.

14. An emulsifier mixture comprising 70 parts by weight of the condensation product of 1 mole of dinonylphenol with 17 moles of ethylene oxide, and 30 parts by weight of cyclohexylammonium dodecylbenzene sulfonate.

15. An emulsifier concentrate comprising 50 parts by weight of the condensation product of 1 mole of dinonylphenol with 17 moles of ethylene oxide, 25 parts by weight of cyclohexylammonium dodecylbenzene sulfonate, and 25 parts by weight of alkylated naphthalene.

References Cited in the file of this patent

UNITED STATES PATENTS

| | | |
|---|---|---|
| 2,283,199 | Flett | May 19, 1942 |
| 2,696,453 | Sanders et al. | Dec. 7, 1954 |
| 2,731,338 | Fike et al. | Jan. 17, 1956 |